(12) United States Patent
Park et al.

(10) Patent No.: US 11,966,103 B2
(45) Date of Patent: Apr. 23, 2024

(54) CIRCULAR RESONATOR, AND OPTICAL MODULATOR AND OPTICAL ELEMENT COMPRISING SAME

(71) Applicant: KYUNGPOOK NATIONAL UNIVERSITY INDUSTRY-ACADEMIC COOPERATION FOUNDATION, Daegu (KR)

(72) Inventors: Hongsik Park, Daegu (KR); Chang-Ju Lee, Daegu (KR); Honghwi Park, Daegu (KR); Muhan Choi, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days.

(21) Appl. No.: 17/032,231

(22) Filed: Sep. 25, 2020

(65) Prior Publication Data
US 2021/0011311 A1    Jan. 14, 2021

Related U.S. Application Data

(63) Continuation of application No. PCT/KR2019/003231, filed on Mar. 20, 2019.

(30) Foreign Application Priority Data

Mar. 30, 2018 (KR) .................. 10-2018-0037109

(51) Int. Cl.
*G02F 1/01* (2006.01)
*G02F 1/225* (2006.01)

(52) U.S. Cl.
CPC .......... *G02F 1/0147* (2013.01); *G02F 1/2257* (2013.01); *G02F 2203/15* (2013.01)

(58) Field of Classification Search
CPC ... G02F 1/0147; G02F 1/2257; G02F 2203/15
See application file for complete search history.

(56) References Cited

U.S. PATENT DOCUMENTS 6,163,061 A * 12/2000 Iida .................. G01J 5/20
257/E31.093
6,542,685 B1 * 4/2003 Yoneda .................. C03C 17/02
385/129
(Continued)

FOREIGN PATENT DOCUMENTS

JP    2000352633       12/2000
JP    2006510952 A  *  3/2006
(Continued)

OTHER PUBLICATIONS

A. Koray Erdamar, Matheus M. van Leest, Stephen J. Picken, J. Caro, "Thermal tuning of a silicon photonic crystal cavity infilled with an elastomer," Proc. SPIE 8095, Active Photonic Materials IV, 80951J (Sep. 12, 2011); doi: 10.1117/12.893940 (Year: 2011).*
(Continued)

*Primary Examiner* — Peter Radkowski
(74) *Attorney, Agent, or Firm* — Ohandt, Greeley and Perle, LLP

(57) ABSTRACT

A circular resonator, and an optical modulator and an optical element comprising same. The circular resonator includes a first material, formed in a circular shape, including a plurality of nano holes and having a thermo-optic coefficient varying at a predetermined ratio according to temperature, and a second material having a thermo-optic coefficient varying in a direction opposite to the direction of change of the thermo-optic coefficient of the first material depending on temperature, the second material being filled in the
(Continued)

plurality of nano holes, wherein an interval between the plurality of nano holes is formed at a pitch shorter than the wavelength of incident light.

7 Claims, 14 Drawing Sheets

(56) References Cited

U.S. PATENT DOCUMENTS

| | | | | |
|---|---|---|---|---|
| 7,907,848 | B1* | 3/2011 | Soref | H04B 10/25 398/140 |
| 8,394,284 | B2* | 3/2013 | Murai | C22C 23/00 136/200 |
| 8,447,145 | B2* | 5/2013 | Goldring | G01N 21/7746 385/2 |
| 8,457,453 | B2* | 6/2013 | Lipson | G02B 6/29353 385/132 |
| 8,538,214 | B2* | 9/2013 | Chen | G02B 6/12007 385/32 |
| 8,628,691 | B2* | 1/2014 | Murai | H10N 10/01 977/773 |
| 8,721,912 | B2* | 5/2014 | Murai | H01L 33/26 977/833 |
| 8,753,547 | B2* | 6/2014 | Rowe | H10N 10/853 252/519.4 |
| 9,134,169 | B2* | 9/2015 | Li | G01J 1/0209 |
| 9,625,785 | B1* | 4/2017 | Zortman | G02F 1/3132 |
| 9,755,128 | B2* | 9/2017 | Banerjee | H10N 10/01 |
| 9,837,781 | B2 | 12/2017 | Krishnamoorthy | |
| 9,966,593 | B2* | 5/2018 | Kovalenko | H01M 4/0495 |
| 9,978,924 | B2* | 5/2018 | Banerjee | C01B 19/007 |
| 10,295,739 | B2* | 5/2019 | Lipson | G02B 6/2934 |
| 11,258,002 | B2* | 2/2022 | Lee | B22F 1/06 |
| 2005/0019842 | A1 | 1/2005 | Prober | |
| 2006/0102224 | A1* | 5/2006 | Chen | H10N 10/852 136/203 |
| 2006/0118158 | A1* | 6/2006 | Zhang | H10N 10/857 136/211 |
| 2009/0086170 | A1 | 4/2009 | El-Ghoroury | |
| 2010/0212328 | A1* | 8/2010 | Murai | C22C 18/00 62/3.2 |
| 2011/0102804 | A1* | 5/2011 | Lipson | G02B 6/12007 356/480 |
| 2011/0149285 | A1* | 6/2011 | Chen | G01N 21/7746 359/341.1 |
| 2011/0198541 | A1* | 8/2011 | Murai | H10N 10/01 252/500 |
| 2012/0301069 | A1* | 11/2012 | Goldring | G02F 1/025 385/2 |
| 2014/0110572 | A1* | 4/2014 | Li | G02F 1/025 250/227.23 |
| 2016/0070062 | A1* | 3/2016 | Lipson | G02B 6/122 385/30 |
| 2016/0261092 | A1 | 9/2016 | Tassaert | |
| 2017/0324218 | A1* | 11/2017 | Krishnamoorthy | H01S 3/10069 |

FOREIGN PATENT DOCUMENTS

| | | |
|---|---|---|
| JP | 2016164986 | 9/2016 |
| KR | 20050073609 | 7/2005 |
| KR | 20100075566 | 7/2010 |

OTHER PUBLICATIONS

Kitzerow et al., Tuning of the Optical Properties in Photonic Crystals Made of Macroporous Silicon, Advances in Optical Technologies vol. 2008, Article ID 780784, 12 pages doi:10.1155/2008/780784 (Year: 2008).*
Orad Reshef, Katia Shtyrkova, Michael G. Moebius, Sarah Griesse-Nascimento, Steven Spector, Christopher C. Evans, Erich Ippen, and Eric Mazur, "Polycrystalline anatase titanium dioxide microring resonators with negative thermo-optic coefficient," J. Opt. Soc. Am. B 32, 2288-2293 (2015) (Year: 2015).*
Pavlichenko et al., Tunable thermoresponsive TiO2/SiO2 Bragg stacks based on sol-gel fabrication methods, Journal of Intelligent Material Systems and Structures 24(18) (Year: 2012).*
Z. Zhang, G. I. Ng, H. Qiu, X. Guo, M. S. Rouifed, C. Liu, and H. Wang, "Dual-band optical filter based on a single microring resonator embedded with nanoholes," in 2017 Conference on Lasers and Electro-Optics Pacific Rim, (Optical Society of America, 2017), paper s2341 (Year: 2017).*
Darius Urbonas, Armandas Balčytis, Kontantinas Vaškevičius, Martynas Gabalis, and Raimondas Petruškevičius, "Air and dielectric bands photonic crystal microringresonator for refractive index sensing," Opt. Lett. 41, 3655-3658 (2016) (Year: 2016).*
M. Bellingeri et al., Optical properties of periodic, quasi-periodic, and disordered one dimensional photonic structures, Optical Materials 72 (2017) 403e421 (Year: 2017).*
Urbonas et al., Air and dielectric bands photonic crystal microring resonator for refractive index sensing, Optics Letters, V. 41, N. 15, p. 3655, 2016 (Year: 2016).*
Mori et al., Chirped photonic crystal waveguides, OSA/CLEO 2004, CWA52 (Year: 2004).*
J. H. Schmid, M. Ibrahim, P. Cheben, J. Lapointe, S. Janz, P. J. Bock, A. Densmore, B. Lamontagne, R. Ma, W. N. Ye, and D.-X. Xu, "Temperature-independent silicon subwavelength grating waveguides," Opt. Lett. 36, 2110-2112 (2011) (Year: 2011).*
Biswajeet Guha, Jaime Cardenas, and Michal Lipson, "Athermal silicon microring resonators with titanium oxide cladding," Opt. Express 21, 26557-26563 (2013) (Year: 2013).*
Biswajeet Guha, Bernardo B. C. Kyotoku, and Michal Lipson, "CMOS-compatible athermal silicon microring resonators," Opt. Express 18, 3487-3493 (2010) (Year: 2010).*
Gao, G., Zhang, Y., Zhang, H. et al. Air-mode photonic crystal ring resonator on silicon-on-insulator. Sci Rep 6, 19999 (2016). https://doi.org/10.1038/srep19999 (Year: 2016).*
Loiko et al. (2015). Thermo-optic dispersion formulas for YCOB and GdCOB laser host crystals. Optical Materials Express. 5.10. 1364/OME.5.001089. (Year: 2015).*
Aravamudhan, S., Luongo, K., Poddar, P. et al. Porous silicon templates for electrodeposition of nanostructures. Appl. Phys. A 87, 773-780 (2007). https://doi.org/10.1007/s00339-007-3901-4 (Year: 2007).*
H. R. Sørensen, J. Canning, J. Lægsgaard, and K. Hansen, "Control of the wavelength dependent thermo-optic coefficients in structured fibres," Opt. Express 14, 6428-6433 (2006) (Year: 2006).*
Zhu, "Theoretical investigation of ultracompact and athermal Si electro-optic modulator based on Cu-TiO2-Si hybrid plasmonic donut resonator", Optics Express, vol. 21, No. 10, May 20, 2013, 14 pages.
Urbonas, "Air and dielectric bands photonic crystal microringresonator for refractive index sensing", Optics Letters, vol. 41, No. 15, Aug. 1, 2016, pp. 3655-3658.
Gao, "Air-mode photonic crystal ring resonator on silicon-on-insulator", www.nature.com, Scientific Reports, Jan. 28, 2016, pp. 1-6.
English translation of International Search Report dated Jul. 9, 2019 for PCT/KR2019/003231, 2 pages.

* cited by examiner

| |
|---|
| 5 - 100nm NT-or LT-InP (Be or undoped) |
| 5 - 10nm InGaAs (undoped) |
| 100nm InP (un-doped) |
| 5nm InGaAs etch stop (undoped) |
| 25nm InP (un-doped) |
| 80nm $\lambda=1.15\mu m$ InGaAsP (un-doped or p-doped) |
| 70nm $In_{0.76}Ga_{0.24}As_{0.52}P_{0.48}$ Barrier |
| 10nm $In_{0.76}Ga_{0.24}As_{0.52}P_{0.48}$ Barrier |
| 10nm $In_{0.76}Ga_{0.24}As_{0.52}P_{0.48}$ Barrier |
| 70nm $In_{0.76}Ga_{0.24}As_{0.52}P_{0.48}$ Barrier |
| 80nm $\lambda=1.15\mu m$ InGaAsP (n-doped) |
| n+ InP |

FIG. 10B

| |
|---|
| 300nm p$^+$-In$_{0.53}$Ga$_{0.47}$As contact |
| 1200nm p$^+$-InP cladding |
| 400nm p-InP cladding |
| 100nm ud-InP cladding |
| 120nm ud-InGaAsP waveguide |
| 50nm ud-In$_{0.53}$Ga$_{0.47}$As barrier |
| 9 nm ud-InAs/In$_{0.53}$Ga$_{0.47}$As TQW (with/without Bi) |
| 20nm ud-In$_{0.53}$Ga$_{0.47}$As barrier |
| 9 nm ud-InAs/In$_{0.53}$Ga$_{0.47}$As TQW (with/without Bi) |
| 50nm ud-In$_{0.53}$Ga$_{0.47}$As barrier |
| 120nm ud-InGaAsP waveguide |
| 1000nm n$^+$-InP cladding |
| n$^+$-InP substrate |

FIG. 10C

| |
|---|
| 300nm GaAs:Be ($2\times10^{19}$ cm$^{-3}$) |
| 50nm 40 → 0% Al$_x$Ga$_{(1-x)}$As:Be ($1\times10^{19}$ cm$^{-3}$) |
| 1.4 μm Al$_{0.4}$Ga$_{0.6}$As:Be cladding ($7\times10^{17}$ cm$^{-3}$) |
| 20nm 20 → 40% Al$_x$Ga$_{(1-x)}$As:Be ($4\times10^{19}$ cm$^{-3}$) |
| 30nm Al$_{0.2}$Ga$_{0.8}$As:Be SCH ($4\times10^{17}$ cm$^{-3}$) |
| 50nm GaAs |
| QW or QD active region |
| 50nm GaAs |
| 30nm Al$_{0.2}$Ga$_{0.8}$As:Si SCH ($2\times10^{17}$ cm$^{-3}$) |
| 20nm 40 → 20% Al$_x$Ga$_{(1-x)}$As:Si ($2\times10^{17}$ cm$^{-3}$) |
| 1.4 μm Al$_{0.4}$Ga$_{0.6}$As:Si cladding ($2\times10^{17}$ cm$^{-3}$) |
| 50nm 0 → 40% Al$_x$Ga$_{(1-x)}$As:Si ($1\times10^{18}$ cm$^{-3}$) |
| 2000nm GaAs:Si ($2\times10^{18}$ cm$^{-3}$) |
| 1000nm GaAs:UID |
| 500nm Ga:UID |
| Si (100) 6° →[111] |

CIRCULAR RESONATOR, AND OPTICAL MODULATOR AND OPTICAL ELEMENT COMPRISING SAME

CROSS-REFERENCED APPLICATIONS

This application is a by-pass continuation application of International Application No. PCT/KR2019/003231, filed on Mar. 20, 2019, which claims priority to Korean Patent Application No. 10-2018-0037109, filed on Mar. 30, 2018, both of which are incorporated herein in their entireties by reference thereto.

BACKGROUND

1. Field of the Disclosure

The disclosure relates to a circular resonator, an optical modulator and an optical element including same and, more particularly, to a circular resonator robust to temperature, an optical modulator and an optical element including same.

2. Discussion of the Background Art

In general, an optical modulator has a Mach-Zehnder Interferometer (MZI) type structure or a micro-ring resonator type structure for converting a change in refractive index into the intensity or phase modulation of a light. The micro-ring resonator structure may have many advantages over the MZI structure. However, conventional micro-ring resonators are mainly made of silicon, which has a disadvantage that it is very sensitive to temperature because of a high thermo-optic coefficient (TOC) of silicon.

Experimentally, since the conventional silicon micro-ring resonator exhibits a resonant wavelength variation of about 0.8 nm depending on temperature, an acceptable external temperature variation range is about 2° C. However, since the ambient temperature at which an actual optical element operates is generally in the range of −20° C. to 70° C., it may be difficult to apply the micro-ring resonator structure to an actual product, in spite of many advantages of the micro-ring resonator structure.

In order to solve the above-described problem, studies have been performed to lower temperature sensitivity of the micro-ring resonator by forming materials different from the TOC of silicon, which is a general resonator material, as cladding of an optical waveguide. However, in order to manufacture an athermal micro-ring resonator robust to external temperature variation, a material which may make the effective TOC to near zero is ideal, and it is very important to reduce the effective TOC which is required in the application field to be applied to be lower than or equal to the effective TOC limit. Materials having characteristics different from the TOC of silicon are mostly organic based materials in which a CMOS compatibility process is not available, and most materials have a refractive index greater than 1 compared to a cladding using air, so there may be problems that optical loss is serious and resonance efficiency is deteriorated.

Therefore, there is a need to develop a technology to solve the temperature dependence of the micro-ring resonator without loss of light and with easy processing.

SUMMARY

Technical Problem

Aspects of the disclosure are to address at least the above-mentioned problems and/or disadvantages and to provide at least the advantages described below. Accordingly, an aspect of the disclosure is to provide a circular resonator that is robust to temperature change, while maintaining resonance efficiency without light loss, an optical modulator and an optical element including same.

Technical Solution

According to an embodiment, a circular resonator includes a first material, formed in a circular shape, including a plurality of nano holes and having a thermo-optic coefficient varying at a predetermined ratio according to temperature and a second material having a thermo-optic coefficient varying in a direction opposite to a direction of change of the thermo-optic coefficient of the first material depending on temperature, the second material being filled in the plurality of nano holes, and an interval between the plurality of nano holes is formed at a pitch shorter than a wavelength of incident light.

The second material may be filled in the plurality of nano holes at a ratio relative to a volume of the first material to offset a change in the thermo-optic coefficient of the first material based on a change in the thermo-optic coefficient of the second material according to temperature.

Each of the plurality of nano holes may be a through-hole which penetrates from one side to other side of the first material.

An interval of the plurality of nano holes may include an interval that is formed at different pitches.

The first material may be in a ring type or a disc type.

The first material may be a semiconductor material or an insulator material, the semiconductor material may be a Si, Ge, or compound semiconductor material, and the insulator material may be $Si_3N_4$ or $SiO_2$.

The second material may be $TiO_2$, MgZnO, YCOB, indium tin oxide (ITO) or GdCOB.

According to an embodiment, an optical modulator further includes a substrate, an optical waveguide, disposed on the substrate, through which incident light passes, and the circular resonator is located on the substrate and is disposed adjacent to the optical waveguide.

An optical element includes the circular resonator, and the first material may include a plurality of layers formed of different types of materials, and the thermo-optical coefficient of the first material is an average thermo-optical coefficient of the thermo-optical coefficient with respect to each of the different types of materials.

Effect of Invention

As described above, a circular resonator, an optical modulator including the same, and an optical element can reduce as much as possible the influence on temperature change while maintaining resonance efficiency without loss of light.

The circular resonator, the optical modulator including the same, and the optical element may be manufactured easily through the existing process.

BRIEF DESCRIPTION OF THE DRAWINGS

FIGS. 10A to 10C are diagrams illustrating a stacked structure of the optical element.

DETAILED DESCRIPTION OF THE PREFERRED EMBODIMENT

Figure 1:
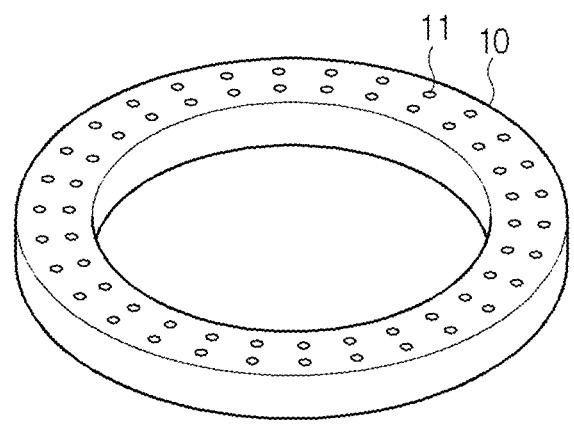
FIG. 1 is a diagram illustrating a circular resonator according to an embodiment.

Hereinafter, various embodiments will be described in detail with reference to the accompanying drawings. The embodiments described herein may be variously modified. Specific embodiments will be depicted in the drawings and will be described in detail in the detailed description. However, it is to be understood that the particular embodiments disclosed in the accompanying drawings are for ease of understanding of various embodiments. Therefore, it is intended that the invention not be limited to the particular embodiments disclosed in the accompanying drawings, but on the contrary, the intention is to cover all equivalents or alternatives falling within the spirit and scope of the invention.

Although the terms "first, second, etc." may be used to describe various components, these elements are not limited by the terms described above. The terms described above are only used to distinguish one element from another.

In this disclosure, the terms "comprises" or "having" and the like are used to specify that there is a feature, number, step, operation, element, part or combination thereof described in the specification, but do not preclude the presence or addition of one or more other features, numbers, steps, operations, elements, parts, or combinations thereof. It is to be understood that when an element is referred to as being "coupled" or "connected" to another element, it may be directly coupled or connected to the other element, or any other element may be interposed therebetween. In the meantime, when an element is referred to as being "directly coupled" or "directly connected" to another element, it should be understood that no other element is present therebetween.

In the disclosure, a "module" or a "~er/~or" may perform at least one function or operation, and be implemented by hardware or software or be implemented by a combination of hardware and software. In addition, a plurality of "modules" or a plurality of "~ers/~ors" may be integrated in at least one module and be implemented by at least one processor except for a "module" or a "~er/~or" that needs to be implemented by specific hardware. Singular forms are intended to include plural forms unless the context clearly indicates otherwise.

When it is decided that a detailed description for the known art related to the disclosure may unnecessarily obscure the gist of the disclosure, the detailed description will be reduced or omitted.

FIG. 1 is a diagram illustrating a circular resonator according to an embodiment.

Referring to FIG. 1, a ring-shaped circular resonator 100 is illustrated. The circular resonator 100 can be made of a first material 10 having thermo-optic coefficients varying at a predetermined ratio according to temperature. The thermo-optic coefficient may denote a change in a refractive index according to thermal changes in the material. The thermo-optic coefficient may vary depending on the current temperature of the material. For example, the first material 10 may be a semiconductor material or an insulator material. The semiconductor material may include silicon (Si), germanium (Ge), or a compound semiconductor material (e.g., GaAs, GaN, InP, InGaAs, InGaAsP, etc.), or the like. The insulator material may include silicon nitride (Si3N4) or silicon dioxide (SiO2), or the like. The first material 10 is not limited to the materials described above, and may include any material that can be used in a semiconductor or an insulator.

A plurality of nano holes are formed in the first material 10. Each of the plurality of nano holes may be formed as a through-hole penetrating from one surface of the first material 10 to the other surface. Each of the plurality of nano holes may be formed to have a predetermined depth at both sides of the first material 10, instead of through-holes. That is, each of the plurality of nano holes may be formed to have a predetermined depth on one surface of the first material 10, and may be formed to have a predetermined depth on the other surface of the first material 10. A diameter of each of the plurality of nano holes may be in the range of a few nanometers (nm) to several hundred nanometers (nm). An interval between the plurality of nano holes is formed at a pitch shorter than the wavelength of incident light. For example, if the wavelength of the incident light is 2 nm, all the intervals of the plurality of nano holes are formed at a pitch shorter than 2 nm.

The plurality of nano holes is filled with a second material 11. The second material 11 is a material having a thermo-optic coefficient varying in a direction opposite to the direction of the change in the thermo-optic coefficient of the first material 10. For example, if the first material 10 is formed of a material with increasing thermo-optic coefficient in accordance with an increase in temperature, the second material 11 may be a material of which thermo-optic coefficient decreases in accordance with increasing temperature. Alternatively, if the first material 10 is formed of a material of which the thermo-optic coefficient decreases in accordance with increasing temperature, the second material 11 may be a material of which thermo-optic coefficient increases in accordance with increasing temperature. In one embodiment, if the first material 10 is silicon, the second material 11 may be titanium dioxide (TiO2). The second material 11 may include materials such as MgZnO, YCOB [YCa4O(BO3)3], ITO (indium tin oxide), GdCOB[GdCa4O (BO3)3], in addition to TiO2. The above example is one embodiment, and the second material 11 may be appropriately selected according to the thermo-optic coefficient of the first material 10.

The circular resonator 100 reflects or refracts incident light to pass or block light of a desired wavelength. However, when the circulator resonator operates, the temperature of the material forming the circular resonator changes over time. If the temperature of the material changes, thermo-optic coefficient varies, and thus, if the temperature of the material changes over a predetermined range, the circular resonator 100 cannot operate normally. However, the circular resonator 100 of the disclosure includes the second material 11 capable of offsetting the thermo-optic coefficient of the first material 10 so as to maintain the change in the thermo-optic coefficient to be near zero even if the temperature changes. Accordingly, the circular resonator 100 of the disclosure can be characterized to be robust to temperature without loss of a Q factor.

Although a ring-shaped circular resonator is illustrated in FIG. 1, a circular resonator may be formed in a form of a disk. The circular resonator in the form of a disk is in a form that a first material is filled in an entire area, and a plurality of nano holes can be distributed throughout the first material. Also, as described above, the plurality of nano holes may be filled with a second material capable of offsetting the thermo-optic coefficient of the first material.

The circular shape represented in the disclosure not only denotes a complete circle, but also a figure including similar circles which are formed of curves without an apex, such as a circle of which some regions are crushed, an oval, or the like.

Figure 2A:
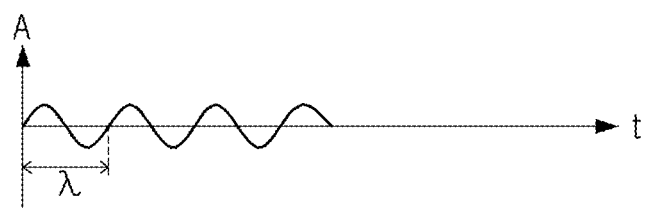
FIGS. 2A and 2B are diagrams illustrating a relation between a nano hole and wavelength of light according to an embodiment.
Figure 2B:
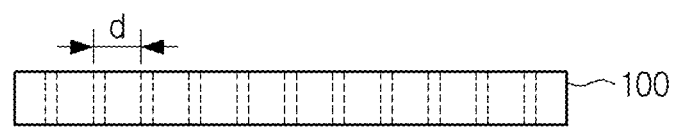

FIGS. 2A and 2B are diagrams illustrating a relation between a nano hole and wavelength of light according to an embodiment.

FIG. 2A illustrates the wavelength of light incident on the circular resonator 100, and FIG. 2B illustrates a side surface of the circular resonator 100. Referring to FIG. 2B, the nano holes formed in the circular resonator 100 are indicated in a dotted line.

As described above, the interval between the nano holes of the circular resonator 100 needs to be shorter than the wavelength of incident light. For example, if the wavelength of the incident light is $\lambda$ and the pitch between the nano holes is d, the relationship of $\lambda > d$ should be satisfied for all intervals between the nano holes.

Referring to FIG. 2B, the nano hole is shown as a through-hole penetrating from one surface of the circular resonator 100 to the other surface, but the nano hole may be formed to have a predetermined depth at one surface, and may be formed to have a predetermined depth on the other surface. Referring to FIG. 2B, the nano holes are arranged in a symmetrical shape, but the nano holes may be asymmetrically arranged. That is, the interval between the nano holes may have the same pitch as each other, and may be formed to have different pitches. If the interval between nano holes is shorter than the wavelength of incident light, the nano holes can be placed in any shape in any location.

Transformation optics which are the background of an operation of the circular resonator 100 will be described below.

Figure 3A:
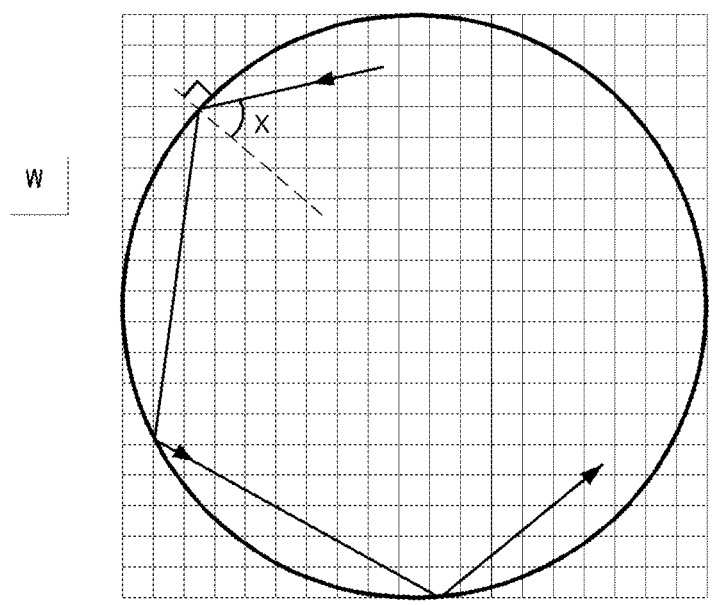
FIGS. 3A and 3B are diagrams illustrating a circular resonator having a uniform refractive index.
Figure 3B:
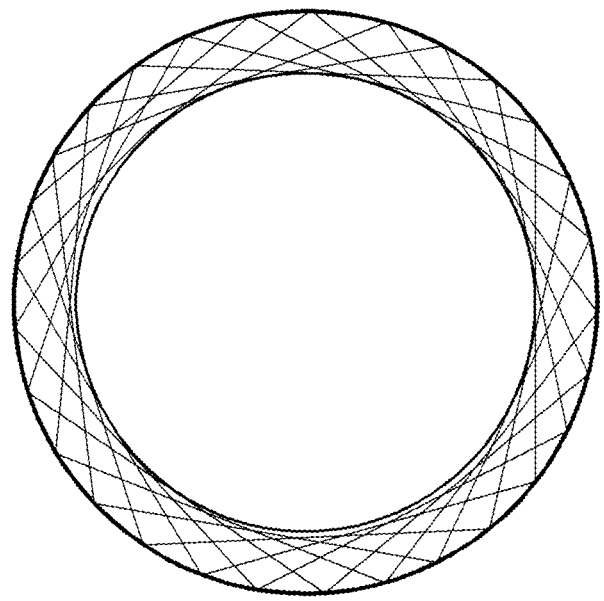

FIGS. 3A and 3B are diagrams illustrating a circular resonator having a uniform refractive index.

The theory of transformation optics starts from the theory of relativity of Einstein, which is the theory that the distortion of a space over which the light propagates causes bending of light according to the distorted space. The path of light bent by gravity can be simulated inside a material having optical material parameters that can vary in accordance with a space. A movement of all electromagnetic fields is defined by Maxwell's equation. If the space in which the electromagnetic wave moves is changed, the Maxwell's equation itself does not change, and only the permittivity and the magnetic permeability constants are changed. The theory of transformation optics, using the property of the electromagnetic wave in a reverse manner, is to control a space in which an electromagnetic wave moves by adjusting a dielectric constant and a magnetic permeability.

The refractive index inside the circular resonator can be set by the application of the theory of transformation optics to which isometric mapping is introduced. The refractive index inside the circular resonator may be set to have a different value. The refractive index inside the circular resonator can be set with at least one of a dielectric permittivity and a permeability.

By setting the refractive index, total reflection of light can be generated in the inside of the quasi-circular dielectric resonator as well as the complete circular resonator. Therefore, even in a quasi-circular dielectric resonator, a high Q-factor can be maintained while a whispering gallery mode (WGM) is generated, and a time for which the light stays may be longer about one thousand times as compared to conventional quasi-circular dielectric resonator of which refractive index is not set. The Q-factor may denote a quality indicator that indicates how long the light is trapped in the resonator.

FIGS. 3A and 3B illustrate a plane orthogonal coordinate system in which a complex plane w (w=u+vi) with a uniform grid is mapped to a circular resonator having a uniform refractive index, and a trajectory of light. The $\chi$ may refer to the angle of incidence of light in the w plane inside the resonator.

Referring to FIGS. 3A and 3B, the trajectory of light in a circular resonator may appear in a straight line. Since the refractive index of the circular resonator is uniformly distributed, the angle of incidence of light in each region inside the circular resonator can be maintained at a critical angle so that the total reflection condition can be satisfied. Therefore, a resonance phenomenon may occur in the circular resonator having a uniform refractive index since the WGM can be generated by total reflection of light. The resonance phenomenon may be generated by a solution of Helmholtz equation, which is one of the secondary partial differential equations under an outgoing boundary condition.

Figure 4A:
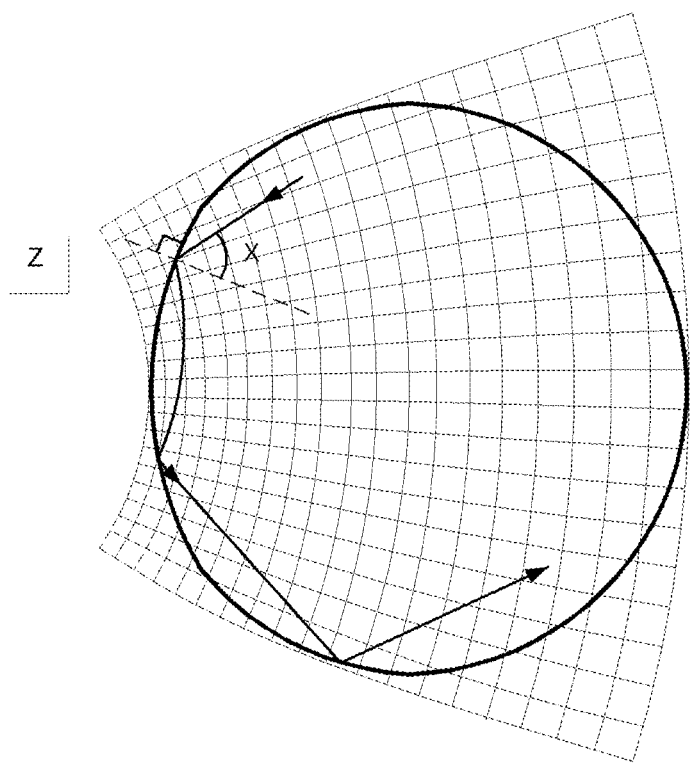
FIGS. 4A and 4B are diagrams illustrating a resonator transformed to a limacon type.
Figure 4B:
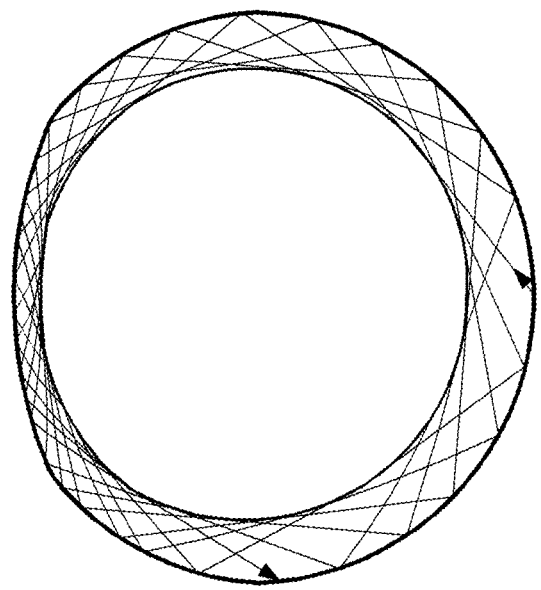

FIGS. 4A and 4B are diagrams illustrating a resonator transformed to a limacon type.

Referring to FIGS. 4A and 4B, an isometric transformation coordinate of a resonator type resonator in a limacon type can be obtained to correspond to a planar rectangular coordinate system of the circular resonator having the uniform refractive index as illustrated in FIG. 3A.

A complex plane (z=x+iy, which is an isometric transformation coordinate of a dielectric resonator in the form of a limacon, can be obtained to correspond to the complex plane (w=u+vi), which is the right angle coordinate of the circular resonator illustrated in FIG. 3A.

The isometric transformation coordinates obtained by the method described above can be mapped to a dielectric resonator in the form of the limacon. The refractive index of the inside of the limacon type resonator can be set so that the incident angle of the light satisfies the total reflection condition inside the limacon-shaped resonator mapped to the z-plane which is the isometric transformation coordinate. The refractive index inside the limacon-type resonator can be set differently according to the spatial location, so that the refractive index in the limcon-type resonator can have different values from each other.

When the refractive index inside the limacon-type resonator to which the z-plane isometric transformation coordinate is mapped is set to be different, the same resonance phenomenon as the resonance phenomenon appearing in the circular dielectric resonator having a uniform refractive index can be represented in the dielectric resonator of the limacon type. Since the angle of incidence of light at each boundary region inside the limacon-type resonator can be a critical angle, total reflection of light can be generated.

Referring to FIG. 3A, a grid of the z-plane of the limacon-type dielectric resonator can be bent while the trajectory of light is straight in a uniform grid of the w-plane of the circular resonator illustrated in FIG. 3A, and the trajectory of the light can also be a curved shape. The incident angle of light in the curved shape described above can be kept the same as the angle of incidence of light $\chi$ in the w plane, and the angle of incidence of light $\chi$ at each boundary region inside the limacon-type resonator can be a critical angle. Thus, the limacon-type resonator can maintain a high Q factor equal to the shape of the WGM appearing in the circular resonator.

The disclosure provides a circular resonator which is robust to temperature change based on the operation background of the circular resonator described above. Thermo-optic coefficient of the first material and the second material that form the circular resonator will be described below. In one embodiment, the first material may be silicon and the second material may be titanium dioxide.

Figure 5A:
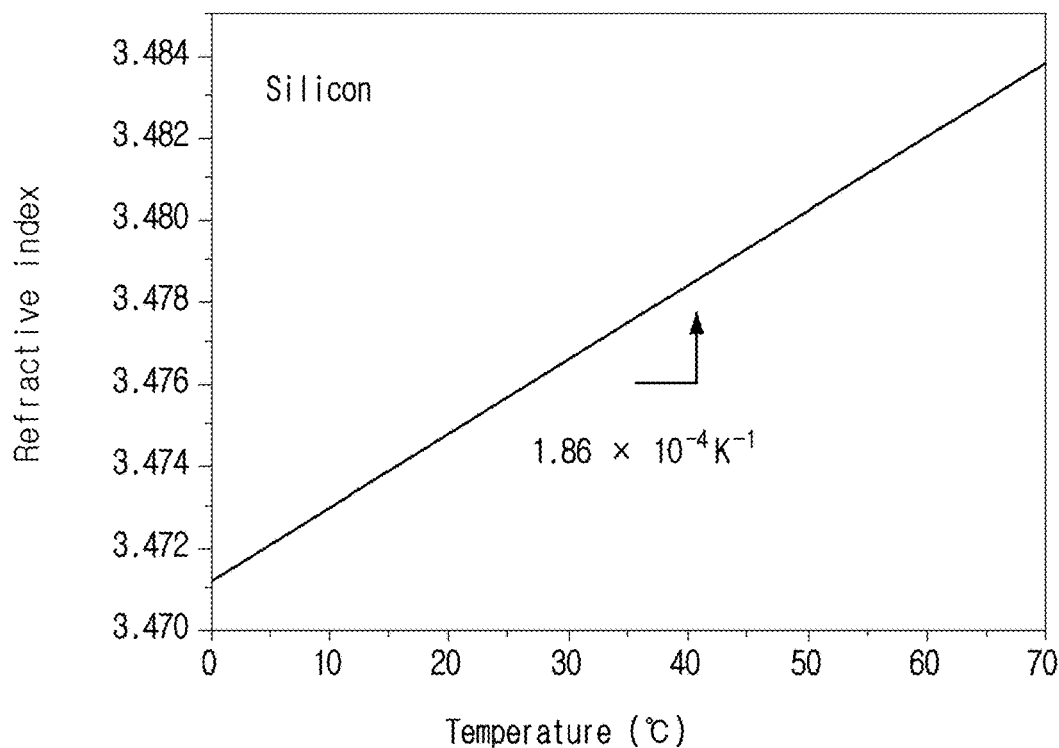
FIGS. 5A and 5B are diagrams illustrating a refractive index of silicon and titanium dioxide.
Figure 5B:
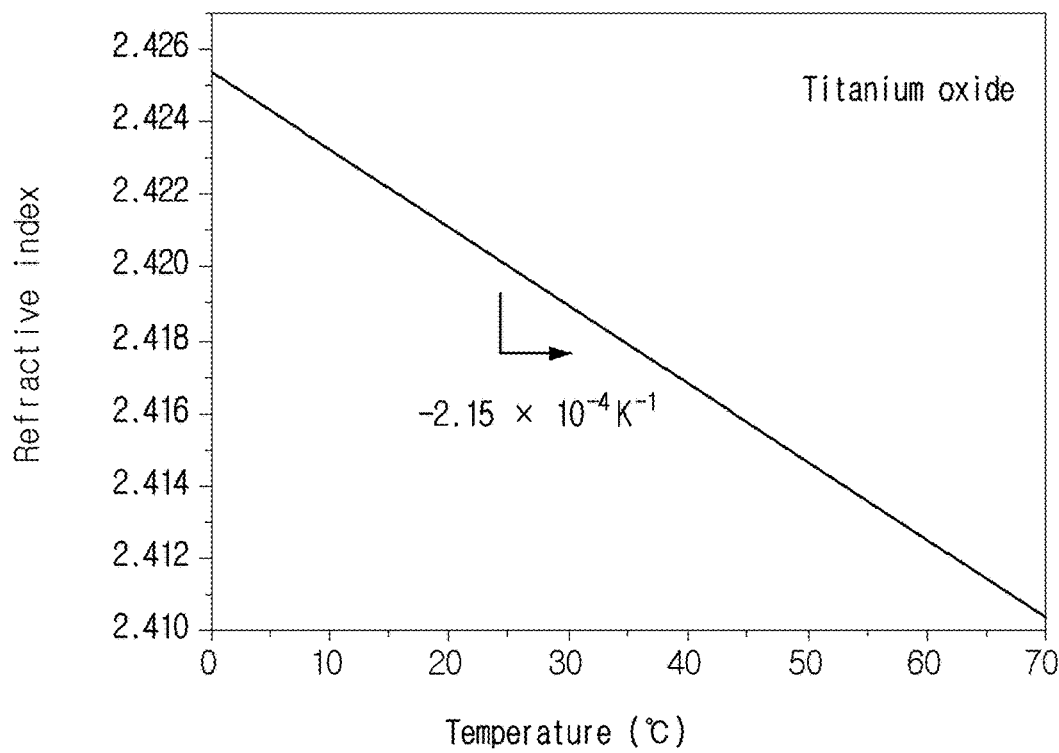

FIGS. 5A and 5B are diagrams illustrating a refractive index of silicon and titanium dioxide.

Referring to FIG. 5A, a refractive index of silicon is illustrated, and a refractive index of titanium dioxide is illustrated in FIG. 5B. Referring to FIG. 5A, the thermo-optic coefficient of silicon increases at a ratio of about $1.86 \times 10^{-4}$ K-1 in accordance with an increase in temperature, and referring to FIG. 5B, the thermo-optic coefficient of titanium dioxide decreases at a ratio of about $2.15 \times 10^{-4}$ K-1 in accordance with an increase in temperature.

If the circular resonator is made of silicon only, the circular resonator's thermo-optic coefficient may change according to the change in temperature, and if the thermo-optic coefficient changes at a certain level or higher, the circular resonator cannot perform a normal operation.

However, if a nano hole is formed on silicon and titanium dioxide is inserted into the nano hole, the change in the thermo-optic coefficient of silicon can be offset by the change in the thermo-optic coefficient of titanium dioxide even if the temperature changes, so that the overall thermo-optic coefficient of the circular resonator is rarely changed. The circular resonator of the disclosure is not sensitive to temperature and can have a characteristic that is robust to changes in temperature.

The above-described silicon and titanium dioxide are examples, and the first material may be formed of a variety of materials. The second material may be selected from materials having a thermo-optic coefficient in which the thermo-optic coefficient of the first material may be offset in view of the thermo-optic coefficient of the first material formed in the circular resonator.

The second material may be inserted into the nano hole at a ratio relative to the volume of the first material forming the circular resonator such that the change in the thermo-optic coefficient of the first material can be offset based on a change in the thermo-optic coefficient of the second material in accordance with temperature. As an embodiment, if the material is silicon and the second material is titanium dioxide, the ratio of the first material to the second material of the circular resonator may be about 1.15:1. Depending on the volume of the first material, the volume of the second material which is filled in the entire nano hole may be adjusted by adjusting the number or size of the nano hole in accordance with the volume of the first material.

Figure 6A:
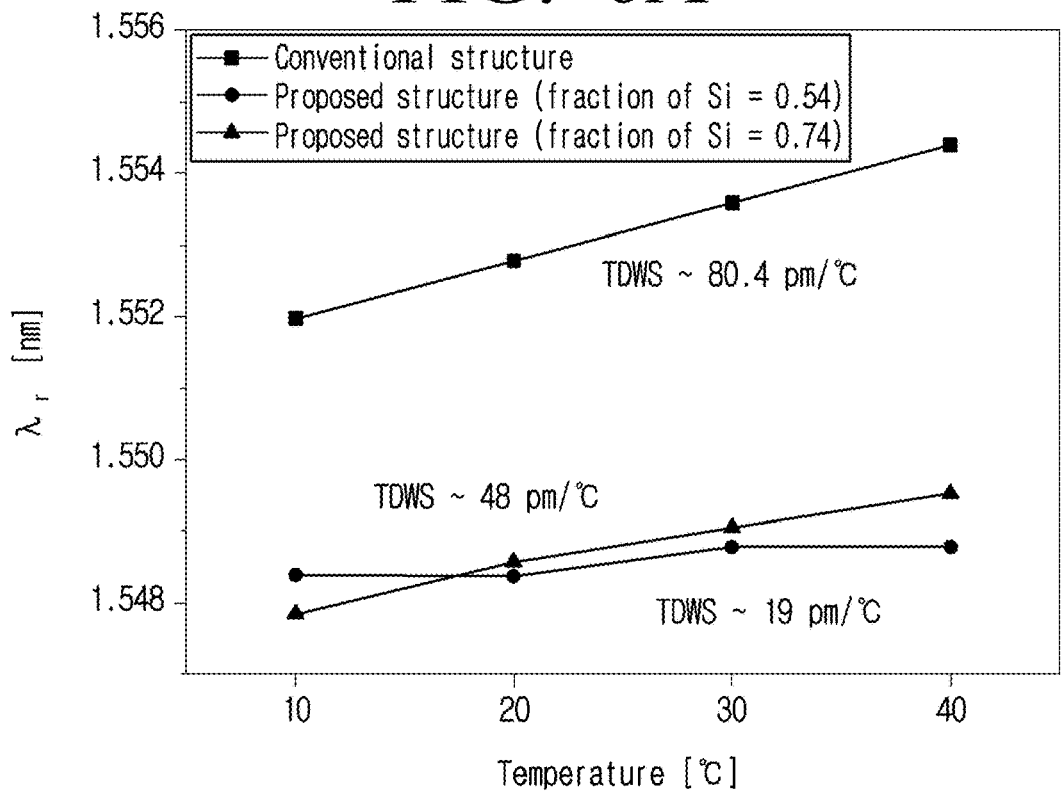
FIGS. 6A and 6B are diagrams illustrating various temperature characteristic of the circular resonator.
Figure 6B:
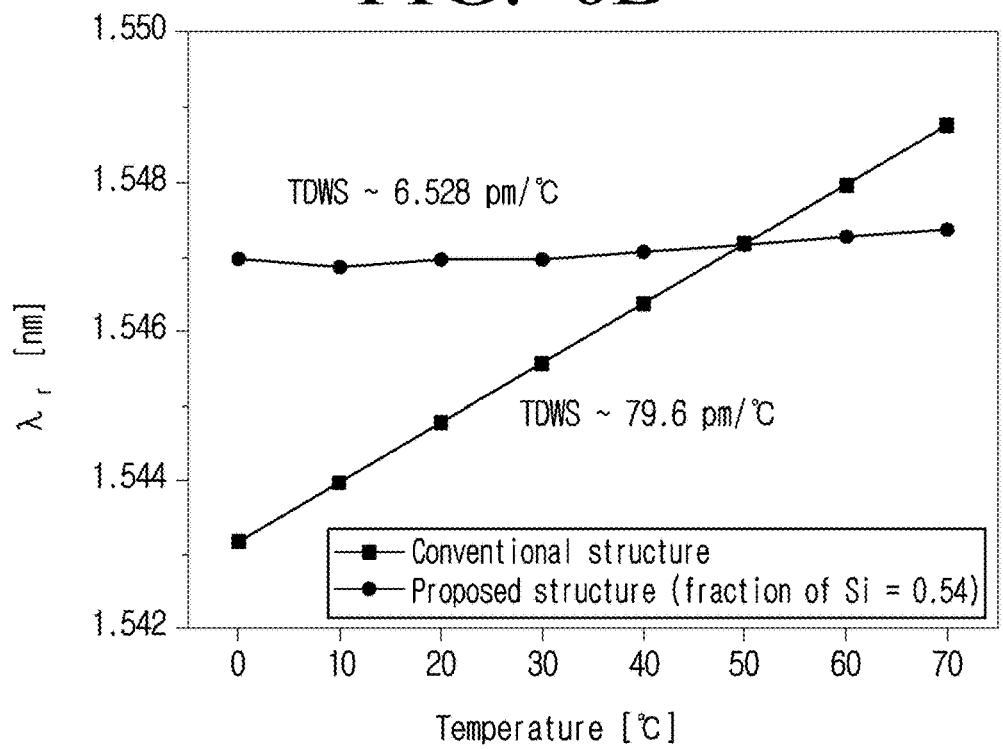

FIGS. 6A and 6B are diagrams illustrating various temperature characteristic of the circular resonator.

Referring to FIG. 6A, a simulation result using COMSOL, which is an optical simulation tool, is illustrated. In the conventional circular resonator structure, the temperature dependence of the wavelength spectrum (TDWS) is very large at about 80.4 pm/° C. However, in the proposed structure, the temperature dependence is reduced to about 48 pm/° C. and 19 pm/° C. depending on the ratio of silicon.

FIG. 6B illustrates a simulation result using a Lumerical FDTD, which is another optical simulation tool. In the conventional structure, the TDWS is very large at about 79.6 pm/° C. However, for the proposed structure, temperature dependence is reduced to about 6.528 pm/° C.

The result may show that the temperature dependence of the circular resonator in which the second material is inserted into the nano hole may be lower than the circular resonator formed with the first material only, and the temperature dependence can be controlled according to the ratio of the second material to the first material. The disclosure can provide a circular resonator robust to temperature changes by forming a nano hole in the first material and adjusting a second material of a volume capable of offsetting the thermo-optic coefficient of the first material in the nano hole. Air having a low refractive index can be used in the cladding of the circular resonator, and since the interval between the holes is very small compared to the wavelength, it is possible to operate while minimizing the loss of the high Q factor which the conventional single material-based circular resonator may have.

It has been described that the first material is silicon and the second material is titanium dioxide. However, as described above, the first material may be various semiconductor materials or insulator materials, in addition to silicon, and the second material may be various materials capable of offsetting the thermo-optical coefficient of the first material. By applying the first material and the second material that can offset the thermo-optical coefficient of the first material, the circular resonator can keep the change in thermo-optical coefficient close to zero even when the temperature changes.

The circular resonator of the disclosure can be used for various devices.

FIGS. 7A to 9B are diagrams illustrating an optical modulator according to an embodiment.

Figure 7A:
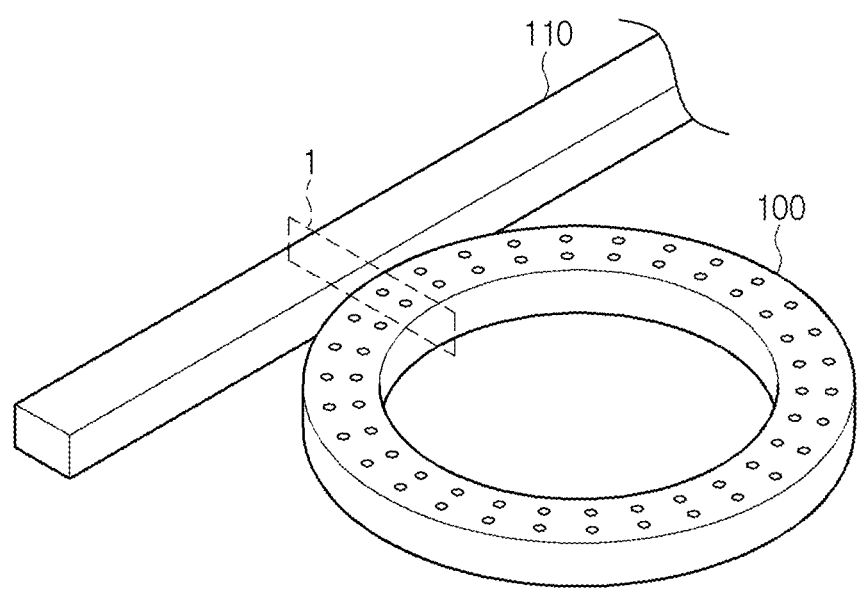
FIGS. 7A to 9B are diagrams illustrating an optical modulator according to an embodiment.
Figure 7B:
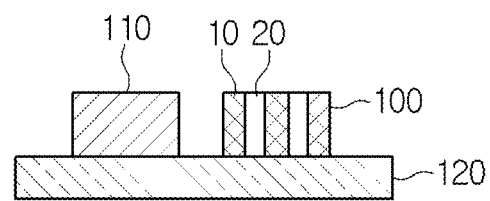

Referring to FIGS. 7A and 7B, the optical modulator according to an embodiment is illustrated. FIG. 7B illustrates a cross section of the circular resonator 100 and a light waveguide 110.

The optical modulator includes the circular resonator 100, the optical waveguide 110, and a substrate 120. The substrate 120 may be formed of a variety of materials, in which a material with small refractive indices is advantageous. As described above, the circular resonator 100 includes the first material 10 and the second material 20 filled in a nano hole formed in the first material, and is located on the substrate. A material having a high refractive index is advantageous for the first material of the circular resonator 100. The optical waveguide 110 is disposed on the substrate 120 and is a path through which incident light passes. For example, when an infrared ray is incident on an optical modulator, the optical waveguide 110 is advantageous with a material having a small refractive index. The circular resonator 100 and the optical waveguide 110 may be spaced slightly apart from each other. For example, an interval between the circular resonator 100 and the optical waveguide 110 may be about 200 nm. A diameter of the circular resonator 100 may be 12 μm, and the width of the optical waveguide 110 may be 450 nm. The above numeral values are merely exemplary, and the interval between the circular resonator 100 and the optical waveguide 110 can be variously formed in consideration of the wavelength of the incident light, or the like.

The optical modulator operates as follows. Light of various wavelengths can be incident through one end of the optical waveguide 110. The light incident on the optical waveguide 110 may be mostly output through the other end of the optical waveguide 110. However, light of a wavelength at which resonance occurs with the circular resonator 100 may be transmitted to the circular resonator 100 and may be totally reflected inside the circular resonator 100.

Thus, the light having a wavelength at which the resonance occurs with the circular resonator 100 may not be output to the other end of the optical waveguide 110.

Figure 8:
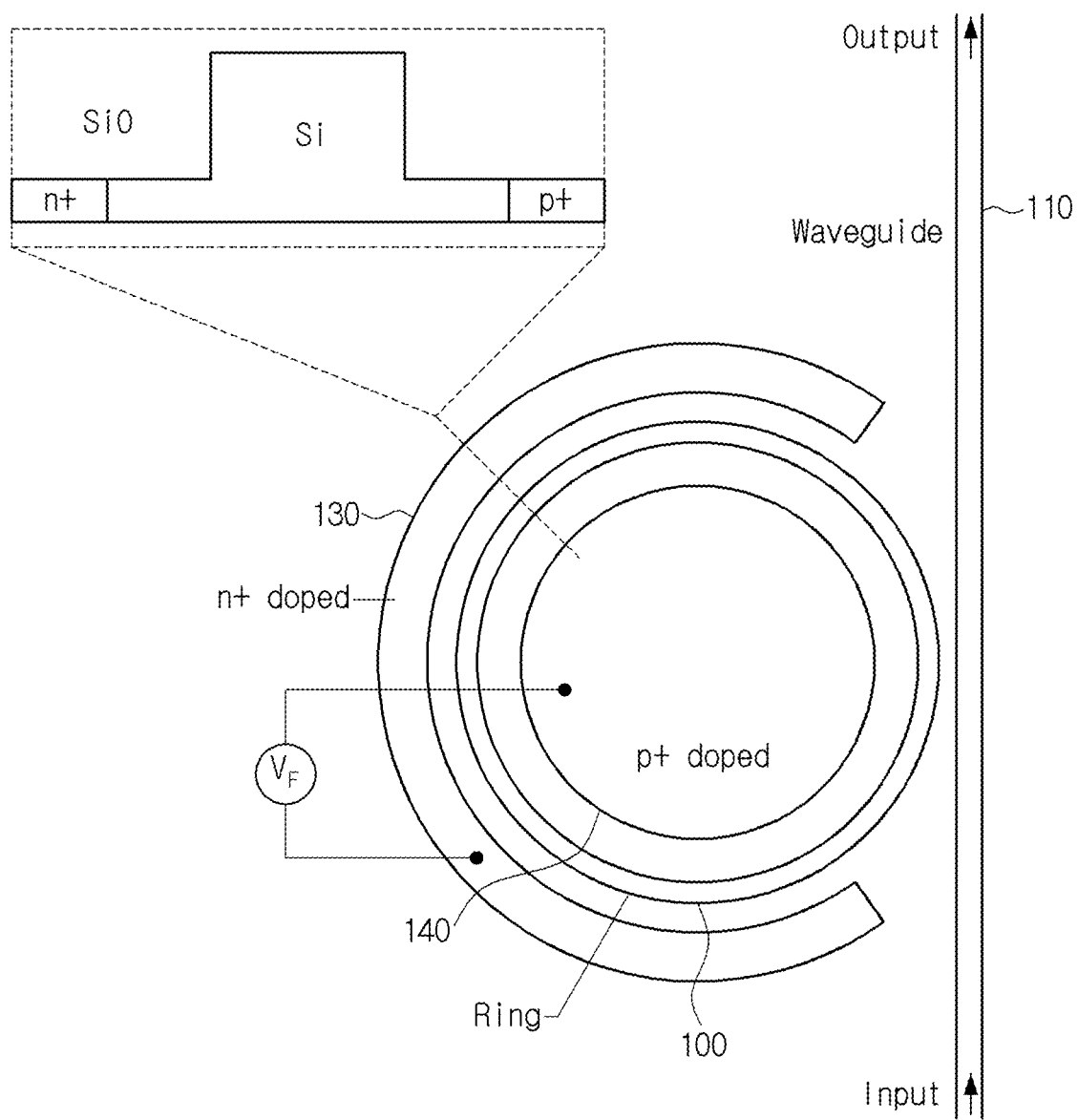

FIG. 8 illustrates a specific structure of the optical modulator.

As described above, the circular resonator 100 and the optical waveguide 110 may be spaced apart from each other on a substrate. If the circular resonator 100 is in the form of a ring, a first material 130 doped with an n+type and a first material 140 doped with a p+type can be disposed inside and outside the circular resonator 100, respectively, and a voltage can be applied between the n+type doped first material 130 and the p+type doped first material 140. For example, the n+type doped first material 130 and the p+type doped first material 140 may be silicon, and the circular resonator 100 may be formed in a bonded form with each of the n+type doped first material 130 and the p+type doped first material 140.

Figure 9A:
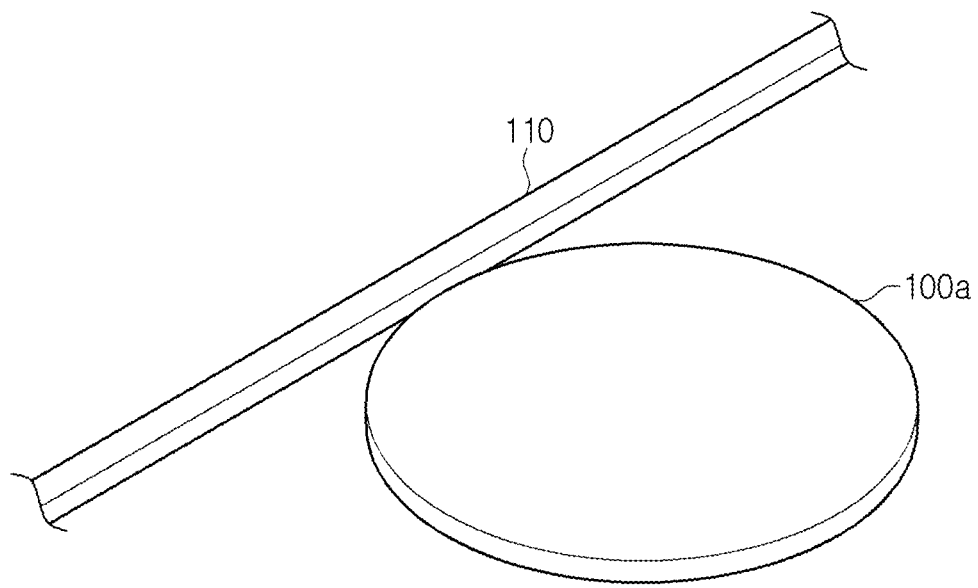
Figure 9B:
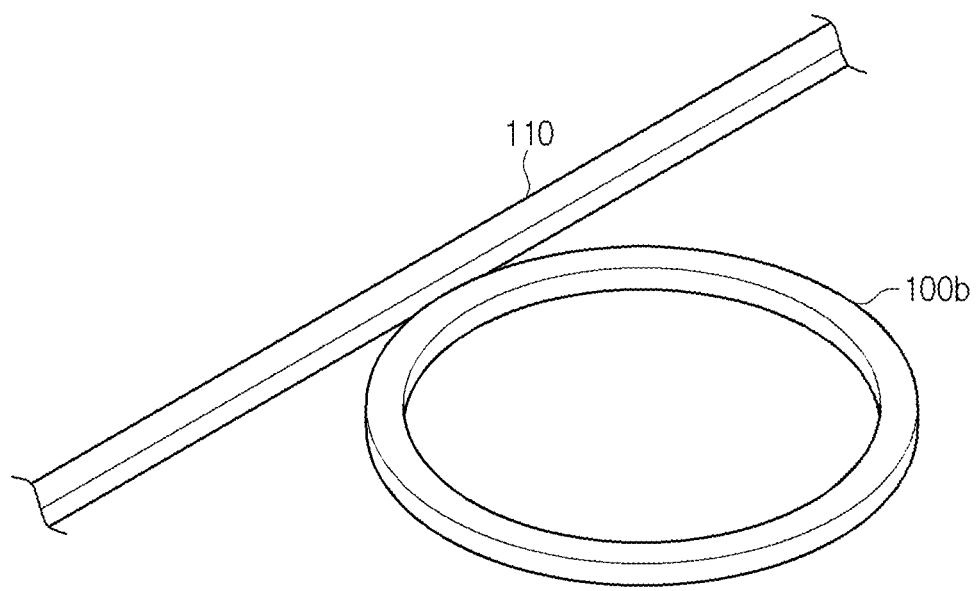

Referring to FIGS. 9A and 9B, an optical modulator of various embodiments is shown. As described above, the circular resonator may be formed in the form of a ring or disk. FIG. 9A illustrates an optical modulator including a circular resonator 100a in the form of a disc, and FIG. 9B illustrates an optical modulator including a circular resonator 100b in the form of a ring. The optical waveguide 110 through which light passes is disposed around the circular resonators 100a and 100b.

A nano hole may be formed throughout the first material of the circular resonator 100a in the form of a disc, and a second material having a thermo-optic coefficient varying in a direction opposite to the direction of change of the thermo-optic coefficient of the first material according to the temperature may be inserted into the nano hole. The arrangement and size of the nano holes can be variously formed. However, the interval between the nano holes should be shorter than the wavelength of incident light.

The circular resonator may be used for an optical element.

FIGS. 10A to 10C are diagrams illustrating a stacked structure of the optical element.

In one embodiment, the optical element may include a laser diode or the like. The optical element can be formed in an epitaxial structure in which various compound semiconductors are stacked. That is, the first material described in the circular resonator described above may be formed of a single material, and may be formed by stacking a variety of different compounds. When the first material is formed in a stacked structure of various compounds, such as the optical element, the second material may be selected based on the average thermo-optic coefficient of the thermo-optic coefficient of each of the various compounds of the first material. The first material of the optical element may be implemented as a plurality of layers formed of different materials, and the thermo-optic coefficient of the first material may be the average thermo-optic coefficient of the thermo-optic coefficient for each of the different materials.

An embodiment in which the circular resonator of the disclosure is applied to an optical element, such as an optical modulator and a laser diode, has been described. However, the circular resonator of the disclosure may be applied to elements such as various optical elements, biosensors, or the like. The circular resonator of the disclosure can be used in the development of an ultra-small, high-performance, high sensitivity, and stably-functioning element by solving the temperature dependence.

What is claimed is:

1. A circular resonator comprising:
a first material, formed in a circular shape including a plurality of nano holes and having a thermo-optic coefficient varying at a predetermined ratio according to temperature, the first material filled in an entire area except for the plurality of nano holes in the circular shape; and
a second material having a thermo-optic coefficient varying in a direction opposite to a direction of change of the thermo-optic coefficient of the first material depending on temperature, the second material being filled in the plurality of nano holes, wherein the second material is selected from the group consisting of MgZnO, YCOB, indium tin oxide (ITO), GdCOB, and any combinations of the foregoing,
wherein an interval between the plurality of nano holes is formed at a pitch shorter than a wavelength of incident light,
wherein volume of the second material is adjusted by adjusting a size of the nano holes depending on volume of the first material,
wherein the first material is in the form of a disc,
wherein a diameter of each of the plurality of nano holes is in the range of a few nanometers of several hundred nanometers, and
wherein the second material offsets the thermo-optic coefficient of the first material so as to maintain the change in the thermo-optic coefficient to be near zero as the temperature changes thereby rendering the circular resonator resilient to temperature changes without loss of a Q factor.

2. The circular resonator of claim 1, wherein the second material is filled in the plurality of nano holes at a ratio relative to a volume of the first material to offset a change in the thermo-optic coefficient of the first material based on a change in the thermo-optic coefficient of the second material according to temperature.

3. The circular resonator of claim 1, wherein each of the plurality of nano holes is a through-hole which penetrates from one side to other side of the first material.

4. The circular resonator of claim 1, wherein an interval of the plurality of nano holes comprises an interval that is formed at different pitches.

5. The circular resonator of claim 1, wherein the first material is a semiconductor material or an insulator material,
wherein the semiconductor material is a Si, Ge, or compound semiconductor material, and
wherein the insulator material is $Si_3N_4$ or $SiO_2$.

6. An optical modulator comprising the circular resonator of claim 1, further comprising:
a substrate;
an optical waveguide, disposed on the substrate, through which incident light passes,
wherein the circular resonator is located on the substrate and is disposed adjacent to the optical waveguide.

7. An optical element comprising the circular resonator of claim 1, wherein the first material comprises a plurality of layers formed of different types of materials, and
wherein the thermo-optical coefficient of the first material is an average thermo-optical coefficient of the thermo-optical coefficient with respect to each of the different types of materials.

* * * * *